(No Model.)
W. A. DUNLAP.
HANDLE FOR COFFEE POTS, &c.
No. 531,788. Patented Jan. 1, 1895.
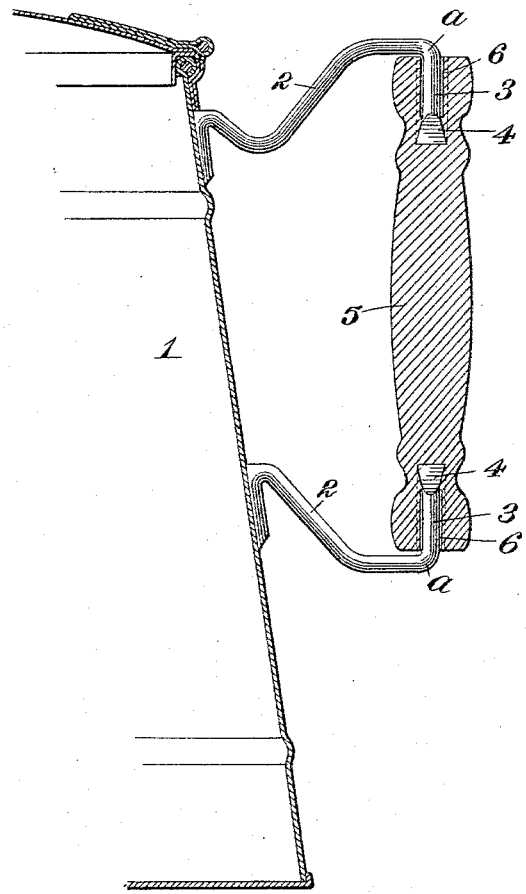
WITNESSES:
Chas. F. Miller
F. E. Gaither
INVENTOR,
William A. Dunlap
by Darwin S. Wolcott
Att'y.

UNITED STATES PATENT OFFICE.

WILLIAM A. DUNLAP, OF PITTSBURG, PENNSYLVANIA.

HANDLE FOR COFFEE-POTS, &c.

SPECIFICATION forming part of Letters Patent No. 531,788, dated January 1, 1895.

Application filed October 25, 1894. Serial No. 526,914. (No model.)

*To all whom it may concern:*

Be it known that I, WILLIAM A. DUNLAP, a citizen of the United States, residing at Pittsburg, in the county of Allegheny and State of Pennsylvania, have invented or discovered certain new and useful Improvements in Handles for Coffee-Pots, &c., of which improvements the following is a specification.

The invention described herein relates to certain improvements in handles for coffee pots and other like articles and has for its object a construction whereby a handle may be so rigidly attached to the body that the latter cannot swing around on the handle as a pivot, when held in the hand; and it is a further object of said invention to provide for the easy and ready renewal of the handle without detaching the connections from the body of the article.

The invention is hereinafter more fully described and claimed.

In the accompanying drawing is shown a sectional elevation of a portion of a coffee pot, and the handle attached thereto.

The coffee pot 1 is constructed in the usual or any suitable manner. The arms 2 which are preferably formed of comparatively heavy spring wire, have their inner ends soldered, riveted or otherwise secured to the body of the article. The outer ends of the arms are bent so as to form fingers 3, projecting toward each other, and having their ends flattened so as to form broad wedge-like points 4. The handle 5, which is formed of wood, has axial holes 6, bored in its ends, said holes being made of a depth less than the length of the fingers 3, preferably by an amount equal to the length of the flattened wedge-like portions 4. After the arms are attached to the body as stated, their free ends are sprung apart, which their resilience will readily permit, and the fingers inserted in the holes in the handle. The flat wedge-like ends 4, are then forced into the wood at the bottom of the holes by blows or pressure applied to the points of junction *a* of the fingers with the arms. As will be readily understood, the flattened ends being embedded in solid wood, will prevent any rotation of the fingers in the handle and consequently the pot will be held from swinging around.

It is preferred that the arms should be so secured to the body of the article that the distance between the points *a* of the two arms will be less than the lengths of the handles 5, so that the resilience of the arms will tend to hold the fingers in the holes in the handle.

In case it is desired to renew the handles, it is only necessary to force the arms apart until the fingers are clear of the holes in the handle, place a new handle in position, release the arms and drive the points 4, into the solid wood, as hereinbefore described.

I claim herein as my invention—

1. The combination of a wooden handle and arms having one end adapted to be attached to the body of a coffee pot or other like article and provided at their opposite ends with fingers projecting toward each other, and having flattened ends adapted to be embedded in the handle, substantially as set forth.

2. As an article of manufacture, a resilient arm having one end adapted to be attached to the body of a coffee pot or other article and provided with a finger at an angle to the arm, said finger being provided with a flattened wedge-like end, substantially as set forth.

In testimony whereof I have hereunto set my hand.

WILLIAM A. DUNLAP.

Witnesses:
DARWIN S. WOLCOTT,
F. E. GAITHER.